(12) United States Patent
Gastonides et al.

(10) Patent No.: US 9,248,917 B2
(45) Date of Patent: Feb. 2, 2016

(54) FIRE DETECTION SYSTEM

(71) Applicant: Kidde Technologies, Inc., Wilson, NC (US)

(72) Inventors: Josephine Gabrielle Gastonides, Dunstable (GB); Paul Alan Rennie, Bracknell (GB); Paul David Smith, Camberley (GB)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 21 days.

(21) Appl. No.: 14/208,640

(22) Filed: Mar. 13, 2014

(65) Prior Publication Data

US 2014/0313061 A1    Oct. 23, 2014

(30) Foreign Application Priority Data

Mar. 13, 2013    (GB) .................................. 1304533.1

(51) Int. Cl.
| | |
|---|---|
| G01C 23/00 | (2006.01) |
| B64D 45/00 | (2006.01) |
| G08B 17/00 | (2006.01) |
| G08B 25/10 | (2006.01) |
| G08B 29/18 | (2006.01) |
| G08B 1/08 | (2006.01) |
| G08B 7/06 | (2006.01) |

(52) U.S. Cl.
CPC ................ *B64D 45/00* (2013.01); *G08B 17/00* (2013.01); *G08B 25/10* (2013.01); *G08B 29/188* (2013.01); *B64D 2045/009* (2013.01); *G08B 7/066* (2013.01)

(58) Field of Classification Search
USPC ...................... 340/963, 539.1, 539.13, 539.22
See application file for complete search history.

(56) References Cited

U.S. PATENT DOCUMENTS

| | | | |
|---|---|---|---|
| 4,357,602 A | 11/1982 | Lemelson | |
| 7,456,750 B2 | 11/2008 | Popp et al. | |
| 7,623,033 B2 | 11/2009 | Ainsworth | |
| 7,810,577 B2 | 10/2010 | Popp | |
| 7,876,230 B2 | 1/2011 | Popp | |
| 2005/0073406 A1* | 4/2005 | Easley | G08B 25/10 340/539.1 |
| 2008/0048031 A1 | 2/2008 | Milliner | |

(Continued)

FOREIGN PATENT DOCUMENTS

| | | |
|---|---|---|
| CN | 202282053 U | 6/2012 |
| JP | 2005115408 A | 4/2005 |

(Continued)

OTHER PUBLICATIONS

Great Britian Search Report for Application No. GB1304533.1. Mailed on Sep. 13, 2013. 8 pages.

(Continued)

*Primary Examiner* — Jack K Wang
(74) *Attorney, Agent, or Firm* — Cantor Colburn LLP

(57) ABSTRACT

A fire detection system for an aircraft, freight transportation vehicle or freight storage facility comprises one or more RFID tags associated with one or more items of freight being transported or stored. The RFID tag is configured to detect a condition indicative of a fire in or in the vicinity the item of freight, for example a temperature rise or generation of smoke. One or more RFID readers are arranged to read the RFID tags. The RFID reader is connected to or forms part of a control system, the RFID reader or the control determining whether the RFID tag has detected a fire.

18 Claims, 1 Drawing Sheet

(56) References Cited

U.S. PATENT DOCUMENTS

| | | | |
|---|---|---|---|
| 2008/0090519 A1* | 4/2008 | Rofougaran | H04B 5/0075 |
| | | | 455/41.1 |
| 2010/0004803 A1* | 1/2010 | Manfredi | B64D 25/00 |
| | | | 701/14 |
| 2012/0126700 A1* | 5/2012 | Mayfield | H05B 37/0272 |
| | | | 315/86 |
| 2013/0186999 A1* | 7/2013 | Huber | B64D 9/00 |
| | | | 244/118.1 |

FOREIGN PATENT DOCUMENTS

| | | | |
|---|---|---|---|
| JP | 2007264869 A | 10/2007 | |
| KR | 100900937 B | 6/2009 | |
| WO | 2006044751 A2 | 4/2006 | |
| WO | 2006044752 A2 | 4/2006 | |

OTHER PUBLICATIONS

RFID Journal. Sep. 1, 2010. "US Forest Service Explores RFID's ABility to Detect Fires". Available from http://www.rfidjournal.com/articles/view77843 [Accessed Sep. 11, 2013].

"Airworthiness Approval and Operational Allowance of RFID Systems", U.S. Department of Transportation Federal Aviation Administration. Sep. 22, 2008. 8 pages.

"Era of Airborne RFID Begins", Bill Carey. Apr. 1, 2011. 4 pages.

Canadian Office Action for Application No. CA2844548. Mailed on Jun. 25, 2015. 4 pages.

Gentag. "NFC Temperature Sensor Tags". Passive Version and Battery-Assisted Logger Versions, GT-301. 1 page.

Great Britian Search Report for Application No. GB1304533.1. Mailed on Jul. 31, 2015. 2 pages.

Intel, Alien, Oracle "RFID Solutions With ROI Now for Transportation, Automotive and Aerospace", 0406/ET/OCG/XX/PDF. 4 pages.

Luis Ruiz-Garcia and Loredana Lunadei (2010). Monitoring Cold Chain Logistics by Means of RFID, Sustainable Radio Frequency Identification Solutions, Cristina Turcu (Ed.), ISBN: 978-953-7619-74-9, InTech, Available from: http://www.intechopen.com/books/sustainable-radio-frequency-identificationsolutions/monitoring-cold-chain-logistics-by-means-of-rfid, 15 pages.

RFID Journal, Catherine O'Connor, "TempTrip Wants to Make Temperature-Tracking as Easy as Netflix", Jul. 6, 2011, 5 pages.

RFID Journal, Claire Swedberg, "Boeing to Launch RFID Program for Airlines in February", Jan. 11, 2012. 3 pages.

RFID Journal, Dave Friedlos, "Indian Mine Monitors Workers and Toxic Gases", Sep. 5, 2008, 3 pages.

RFID Journal, Mark Roberti, "What Is the Best Option for Remote Temperature Sensing?", 2 pages.

* cited by examiner

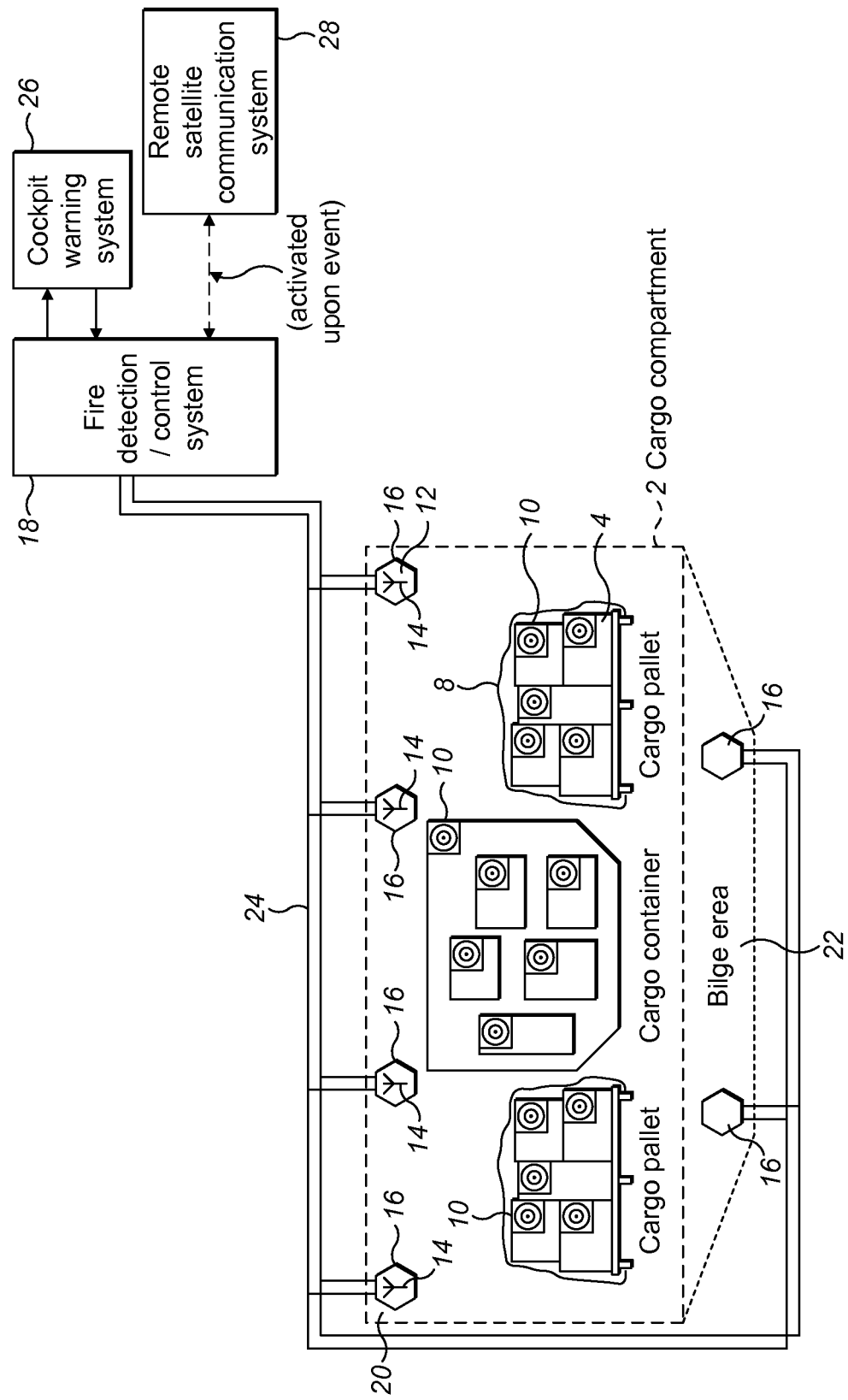

FIRE DETECTION SYSTEM

CROSS REFERENCE TO RELATED APPLICATIONS

This application claims priority to Great Britain Patent Application No. 1304533.1 filed Mar. 13, 2013, the entire contents of which is incorporated herein by reference.

TECHNICAL FIELD

The present disclosure relates to a fire detection system and in particular to a fire detection system for use in aircraft, freight transportation vehicles or freight storage facilities.

BACKGROUND

Freight is now commonly transported by a variety of means, for example by truck, trailer, rail, ship and by air. Freight is also commonly stored in warehouses or other storage facilities. There is always a danger that due to the nature of the freight itself, or to external factors, the freight may catch fire. If not detected, the fire may spread to other freight and to other parts of the aircraft, vehicle or storage facility. This is particularly undesirable in aircraft, where the consequences of a fire may be catastrophic. It is therefore desirable that fire originating in freight is quickly detected.

In many instances, however, the freight will not be visible to staff or crew so it will be difficult easily to identify if and where a fire may have started. Some aircraft, vehicles and storage facilities are provided with fire detection systems which incorporate static fire detectors. These systems may provide an indication of a fire in the aircraft, vehicle or storage facility, but they may not detect the fire at an early stage. This is particularly so if the freight is being transported or stored in containers or pallets, commonly referred to as Unit Load Devices ("ULDs"). In this case a fire may have started within a ULD but the static, external detectors may not sense that fire very quickly. By the time smoke or fire penetrates the walls of the ULD and triggers the fire detection system, the fire may have developed to a significant degree making it difficult to control the fire and, in aircraft based systems, giving only limited time for the aircraft to be landed safely. Moreover, these fixed systems do not provide staff or crew with information regarding the nature of the goods which have caught fire, or other information which may be of use to the staff or crew when deciding how best to deal with the fire. The fixed system may also not provide a particularly accurate indication of the location of the fire. The present disclosure seeks to address at least some of these issues.

SUMMARY

There is disclosed herein a fire detection system for an aircraft, freight transportation vehicle or freight storage facility comprising: one or more RFID tags associated with one or more items of freight being transported or stored, said RFID tag being configured to detect a condition indicative of a fire in or in the vicinity the item of freight; one or more RFID readers arranged within the transportation vehicle or storage facility to read said one or more RFID tags; said RFID reader being connected to or forming part of a control system, the RFID reader or the control system determining whether the RFID tag has detected a fire condition.

A method of detecting a fire in an aircraft, freight transportation vehicle or freight storage facility comprising: providing one or more items of freight with an RFID tag said RFID tag being configured to detect a condition indicative of a fire in or in the vicinity of the item of freight; providing the transportation or storage facility with one or more RFID tag readers; reading said RFID tag with said RFID tag reader; and determining from the reading if a fire has been detected.

Thus, in accordance with this disclosure, an RFID tag, which is commonly attached to an item of freight for tracking and inventory purposes, is configured also to detect a fire condition. The RFID tag is read by an RFID tag reader which is connected to or forms a part of a control system which identifies if a fire condition has been detected by the RFID tag. The RFID reader or the control system of which it is a part determines whether a fire has been detected by an RFID tag.

By using an RFID tag provided on a freight item, a fire can be detected more quickly and appropriate action taken than when using fixed detectors. Moreover, no special fire detector needs be provided on the freight—the fire sensing capability is incorporated into an RFID tag which will be provided on the freight item for inventory, tracking or other purposes.

The item of freight may be contained in a ULD and the ULD may itself be provided with an RFID tag.

The fire condition is one which indicates that a fire has actually started or it may be a fire precursor condition. It can therefore be, for example, a temperature condition, for example a predetermined temperature or temperature rise. RFID tags are frequently provided with a temperature sensing function, particularly where temperature sensitive goods are being transported. The control system may therefore be configured to identify a fire when a predetermined temperature or temperature rise has been sensed.

Additionally or alternatively, the fire condition may be, for example, smoke or gas production. The RFID tag may therefore be provided with a smoke or gas sensing function.

The control may, upon determining that a fire condition has been detected by an RFID device, take various actions.

In a first embodiment, it may trigger a warning, for example in a monitoring facility, aircraft cockpit, vehicle cabin or the like to alert staff to check the hazard and take appropriate action.

This action may involve, for example, activation of a manual fire suppression system. Additionally or alternatively, in aircraft based systems, the aircraft can be directed to an appropriate location at which the fire may be tackled by an appropriately equipped ground crew to tackle the fire. Depending on the nature of the fire or the goods, this may be the nearest airport, for example, or an airport which has capability for handling the particular hazard identified. Additionally or alternatively the control may automatically initiate a fire suppression system.

The system may further communicate a warning to a remote location, for example the airport where an aircraft intends to land, to warn the ground crew of the nature of the goods etc involved in the fire so that appropriate fire fighting equipment may be prepared. This communication link may be initiated only upon detection of the fire.

The detection system may also make use of other data held by the RFID tag in assisting staff and crew handle the fire.

For example, the data held on the RFID tag may include an indication of the type of item, for example whether it is hazardous, the quantity and so on. This data will be extremely useful to firefighters in tackling the fire.

A shipper may not wish this data to be openly available, so the system may be configured such that before a fire or fire precursor condition is detected, only data relevant to fire detection is accessible. Only when a fire has been detected will the additional data become accessible.

The system may also assist in more accurately indicating the location of the fire in the aircraft, vehicle or storage facility. For example, the ID data held by the RFID tag may be linked to a cargo manifest which may indicate the location of the item within the aircraft, vehicle or storage facility. The system may therefore provide cargo manifest data or provide access to cargo manifest data to staff, crew etc., in the facility or remote therefrom, e.g. fire crew at an airport.

In addition, should more than one RFID reader be employed, the position of the RFID tag could be calculated by triangulation.

Any relevant data, e.g. the position of the freight, may be displayed by a suitable graphical user interface in the cockpit or elsewhere.

The aircraft, vehicle or storage facility may already be provided with a fire detection system. Typically this may include a number of fire detectors arranged at fixed positions within the facility. This may not provide an early indication of fire, particularly if, as discussed above, the fire starts within a container or pallet. The RFID tag system discussed above improves the detection of fire as the detectors, i.e. the RFID tags themselves, will be attached to the item of freight or its packaging, which may be within a Unit Load Device.

The RFID tag detector system may be suitably integrated with the fixed fire detector system. For example, the RFID tag system may be connected to the same control system as the fixed fire detectors.

In another embodiment, the RFID tag need not incorporate a fire detecting capability. It may, however, be integrated with the fixed fire detector system such that when a fixed fire detector detects a fire, an RFID reader interrogates the RFID tag to read ID or other item data thereby allowing this data to be made available to crew etc. From another aspect of this disclosure therefore, there is provided a fire detection system for an aircraft, freight transportation vehicle or freight storage facility comprising: one or more fixed fire detectors; one or more RFID tags associated with one or more items of freight being transported or stored; and one or more RFID readers arranged within the aircraft, transportation vehicle or storage facility for interrogating said one or more RFID tags in the event that said detector senses a fire for making data regarding the item of freight available to the fire detection system.

For example, an RFID reader closest to the detector which sensed the fire may interrogate an adjacent RFID tag.

In addition to acting to produce a warning of a fire based solely on the RFID tags, the RFID tags may be integrated with the fixed detector system to improve the sensitivity of the system. For example, many fixed detector systems may be operated at a high sensitivity level, but this may mean that the system produces false alarms. In one embodiment, therefore the RFID tags may act as a pre-alarm to increase the sensitivity of one or more the fixed detectors, for example those detectors located in the vicinity of the RFID tag that has generated the warning.

BRIEF DESCRIPTION OF THE DRAWING

An exemplary embodiment of fire detection system in accordance with this disclosure will now be described with reference to the accompanying FIG. 1.

DETAILED DESCRIPTION

FIG. 1 illustrates schematically an embodiment of this disclosure in an aircraft cargo compartment 2. Of course it will be recognised that this is not limiting and that the system is applicable to other freight transportation vehicles such as trucks, trailers and ships and also to storage facilities such as warehouses. The cargo compartment 2 is therefore simply representative of a space in which freight is transported or stored.

Items of freight 4 are contained within the cargo compartment 2 in ULDs, for example in cargo containers 6 or cargo pallets 8. Multiple items of freight 4 are shown contained in each ULD, although it will be appreciated that one or more items of freight 4 can be so contained.

As illustrated, each item of freight 4, and the container 6 is fitted with an RFID tag 10. Although each item of freight 4 is shown as having an RFID tag 10, this is not essential, and only certain items 4 may be so fitted. Also, while the container 6 is shown as fitted with an RFID tag 10, this is not necessary and one, more or none of the ULDs may be fitted with RFID tags 10 if desired.

RFID tags 10 are usually provided on freight 4 for tracking and inventory purposes, but in accordance with this disclosure, the RFID tags 10 are provided with features which detect a fire condition. As used herein, the term "fire condition" is not limited to fire per se, but also extends to fire precursor conditions, i.e. conditions that indicate that a fire has started or may be about to do so. For example, the RFID tag 10 may be configured to measure temperature. Such functionality is already provided in certain RFID tags, for example in the transportation and storage of temperature sensitive goods. Additionally or alternatively, the RFID tag 10 may be configured to detect other conditions indicative of fire, such as smoke or other gases. Again such functionality has been incorporated in RFID tags.

The RFID tags 10 may be of any appropriate type, for example, passive, battery assisted, low-power active or active. These types of tags are well known in the art. A passive tag is not powered and will transmit data only when interrogated by an RFID reader. A battery assisted tag has a battery which powers for example a chip or other component of the tag, but which will only transmit after interrogation by a reader. An active tag is one which is provided with a power source such that it can transmit continuously, for example where data is required in real time. For aircraft applications, battery assisted or passive tags may be desirable but the disclosure is not limited to such. Of course any RFID tag 10 used should comply with any regulations and standards that apply to the field of use.

In the disclosed embodiment, the cargo compartment 2 is also provided with a plurality of RFID readers 12. The type of reader 12 used will be appropriate to the tag 10, but will typically include a transceiver 14 for interrogating the RFID tag 10 and receiving its response.

The cargo compartment 2 is also fitted, as is conventional in the art, with a fixed fire detection system which comprises a plurality of fire detectors 16 connected to a control 18. The detectors 16 are typically mounted in fixed locations in the cargo compartment 2, for example in the roof 20 and the floor or bilge area 22 of the compartment 2. The detectors 16 are typically hard wired into the control 18 by wiring 24, although wireless connections are also possible. As is known in the art, when the detectors 16 detect a fire, the control 18 will take an appropriate action such as providing a warning to the aircraft cockpit to allow a member of crew to take action, for example initiate a manually operated fire suppression system.

The RFID readers 12 may be mounted separately from the fixed detectors 16 or, as illustrated schematically, in some way incorporated therein or therewith. In this embodiment the RFID readers 12 are connected to the control 18 through the same wiring 24 as the fixed detectors 16, although the RFID readers 12 may be connected to the control 18 through separate means, either wired or wireless.

The control system 18 in this embodiment is common to the fixed detector system and the RFID based system, but separate or linked controls may equally be provided.

The control system 18 is connected to a number of systems, for example a cockpit warning system 26 and a communication system 28, for example a satellite communication system.

Details of the functioning of the system will now be discussed.

In use, the RFID tags 10 associated with the freight will act as detectors for a fire condition in or adjacent their associated item of freight 4 or ULD 6. Thus the RFID tag 10 may for example monitor the temperature of the item 4, and/or the presence of smoke adjacent the item 4. As the RFID tag 10 is close to the item 4, it will detect the fire much more quickly than the fixed detectors 16 in the compartment 2.

The RFID tags 10 will be interrogated periodically by the RFID readers 12 which provide information supplied by the RFID tags 12 to the control 18 which will determine whether a fire condition has been sensed and take appropriate action. Of course the determination may be done within the RFID reader 12 and an appropriate signal sent to the control 18.

In this embodiment he control 18 is connected to the cockpit warning system 26. When a warning is generated in the cockpit, the crew may take appropriate action, for example initiating a fire suppression system to control the fire. They may also for example take steps to land the aircraft as soon as possible if that is deemed appropriate, to allow the fire to be tackled by ground based crew.

Additionally or alternatively the control 18 may automatically initiate a fire suppression system.

However, the additional information provided on the RFID tags 10 allows additional information to be provided to the crew and others.

For this reason, the control system may also communicate relevant data to an external party, for example ground crew, fire authorities and so on via the communication system 28. This communication may be initiated only upon detection of a fire event.

The information held on the RFID tag 10 may for example include an indication of the type of item 4 concerned, e.g. whether it is hazardous, and its quantity. This information will assist crew in taking the appropriate action. For example it will allow ground crew to provide appropriate fire fighting equipment when the aircraft lands.

To secure data held on the RFID tag 10, during normal operation, i.e. before a fire condition is detected, only data relevant to fire detection may be accessible through the RFID reader 12. Thus data concerning the item itself will remain inaccessible. Only when a fire condition has been detected will that additional information become accessible to the system.

The RFID tag 10 may also assist in more accurately indicating the location of the fire within the storage compartment 2. The RFID tag 10 will normally contain a unique ID for the relevant item of freight 4. Moreover, the container 6 or pallet 8 on which the items 4 of freight are loaded will also have a unique code. The position of the container or pallet in the storage compartment 2 will also generally be known as freight is normally loaded according a well determined plan, based on information regarding hazardous materials, weight distribution, priority of cargo, etc. This plan of loading may be included as a part of the cargo manifest which is normally accessible for example by the airline and the shipper. The control system may therefore also provide or transmit cargo manifest data to, or provide access to such data to staff, fire crew etc., to inform them in advance where in the cargo compartment 2 the source of the fire is located and where hazardous/flammable materials may be present, for example.

The data may be displayed by a suitable graphical user interface provided in the cockpit or remotely.

In another embodiment, the RFID tags 10 may not incorporate a fire detecting capability. They may, however, be integrated in the fixed detector system such that when the fixed detectors 16 detect a fire, the control 18 interrogates the RFID tags 10 to read ID or other item data as discussed above, thereby allowing this data to be made available to crew etc.

In addition to acting to produce a warning of a fire based solely on the RFID tags 10, the tags 10 may be integrated with the fixed detector sensor system to improve the sensitivity of that system. In this way, the fixed detectors 16 are more likely to detect the fire without producing false alarms. Thus in one example, a predetermined sensed temperature or increase in temperature, or other fire indicator detected by an RFID tag 10 will act as a trigger to increase the sensitivity of the fixed detectors 16.

It will be understood that while the embodiment described above shows an aircraft based system, the disclosure is not limited to this and it may be applied to any freight transportation or storage facility, such as trucks, trailers, ships and warehouses.

The invention claimed is:

1. A fire detection system for an aircraft, freight transportation vehicle or freight storage facility comprising:
   one or more RFID tags associated with one or more items of freight being transported or stored, said RFID tag being configured to detect a condition indicative of a fire in or in the vicinity the item of freight;
   one or more RFID readers arranged within the transportation vehicle or storage facility to read said one or more RFID tags;
   said RFID reader being connected to or forming part of a control system, the RFID reader or the control system determining whether the RFID tag has detected a fire condition.

2. The system of claim 1, wherein the fire condition is a temperature condition.

3. The system of claim 2, wherein the temperature condition is a predetermined temperature or a temperature rise.

4. The system of claim 1, wherein the fire condition is a smoke or gas production condition.

5. The system of claim 1, wherein a warning is produced when a fire condition has been detected.

6. The system of claim 5, wherein the warning is provided in or on the aircraft, freight transportation vehicle or storage facility and/or remotely therefrom.

7. The system of claim 6, comprising communication means for communicating a warning to a remote location.

8. The system of claim 7, wherein the warning includes data held by the RFID relating to the item of freight.

9. The system of claim 8, wherein the data includes one or more of an indication of the type of freight, the quantity of freight and the location of the freight.

10. The system of claim 9, wherein prior to a fire condition being detected, only data relevant to fire detection is accessible, other data only becoming accessible after a fire condition has been detected.

11. The system claim 10, wherein the data comprises ID data which is linked to a cargo manifest, which gives an indication of the location of the freight item.

12. The system of claim 1, wherein the freight transportation vehicle or storage facility is additionally provided with a fixed fire detector system and the RFID tag detector system is integrated with the fixed fire detector system.

13. The system of claim 12, wherein the detection of a fire condition by an RFID tag acts to increase the sensitivity of one or more the fixed fire detectors.

14. A method of detecting a fire in an aircraft, other freight transportation vehicle or freight storage facility comprising:
   providing one or more items of freight with an RFID tag said RFID tag being configured to detect a condition indicative of a fire in or in the vicinity of the item of freight;
   providing the transportation or storage facility with one or more RFID tag readers;
   reading said RFID tag with said RFID tag reader; and
   determining from that reading if a fire condition has been detected.

15. The method of 14, wherein the fire condition is a smoke or gas production condition.

16. The method claim 15 wherein a warning is produced when a fire condition has been detected.

17. The method of claim 16, wherein the warning is provided in or on the aircraft, freight transportation vehicle or storage facility and/or remotely therefrom.

18. A fire detection system for an aircraft, freight transportation vehicle or freight storage facility comprising:
   one or more fixed fire detectors;
   one or more RFID tags associated with one or more items of freight being transported or stored;
   one or more RFID readers arranged within the transportation vehicle or storage facility for interrogating said one or more RFID tags in the event that said fire detector senses a fire for making data regarding the item of freight available to the fire detection system.

* * * * *